(12) United States Patent
Esaka et al.

(10) Patent No.: US 12,305,029 B2
(45) Date of Patent: May 20, 2025

(54) RUBBER COMPOSITION AND FRICTION TRANSMISSION BELT

(71) Applicant: Mitsuboshi Belting Ltd., Kobe (JP)

(72) Inventors: Mayu Esaka, Hyogo (JP); Yusuke Hemmi, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 585 days.

(21) Appl. No.: 17/763,905

(22) PCT Filed: Sep. 25, 2020

(86) PCT No.: PCT/JP2020/036436
§ 371 (c)(1),
(2) Date: Mar. 25, 2022

(87) PCT Pub. No.: WO2021/060532
PCT Pub. Date: Apr. 1, 2021

(65) Prior Publication Data
US 2022/0348753 A1    Nov. 3, 2022

(30) Foreign Application Priority Data

Sep. 25, 2019 (JP) .................. 2019-174609
Sep. 14, 2020 (JP) .................. 2020-153926

(51) Int. Cl.
| | |
|---|---|
| C08L 23/16 | (2006.01) |
| C08K 3/04 | (2006.01) |
| C08K 7/02 | (2006.01) |
| C08L 39/06 | (2006.01) |
| F16G 1/10 | (2006.01) |
| F16G 5/08 | (2006.01) |
| F16G 1/06 | (2006.01) |

(52) U.S. Cl.
CPC .............. *C08L 23/16* (2013.01); *C08L 39/06* (2013.01); *F16G 1/10* (2013.01); *F16G 5/08* (2013.01); *C08L 2205/03* (2013.01); *C08L 2205/16* (2013.01); *F16G 1/06* (2013.01)

(58) Field of Classification Search
CPC ........ C08L 2205/16; C08L 39/06; C08L 9/00; C08L 9/02; C08L 9/06; C08L 15/005; C08L 15/02; C08L 23/16; C08L 25/10; C08K 7/02
See application file for complete search history.

(56) References Cited

U.S. PATENT DOCUMENTS

| | | |
|---|---|---|
| 6,303,221 B1 | 10/2001 | Prior et al. |
| 11,092,210 B2 * | 8/2021 | Gerring ............... B29D 29/106 |
| 2007/0060431 A1 | 3/2007 | Hineno et al. |
| 2013/0150488 A1 | 6/2013 | Feng |
| 2015/0315372 A1 | 11/2015 | Feng et al. |
| 2016/0298725 A1 | 10/2016 | Ishiguro et al. |
| 2017/0211225 A1 | 7/2017 | Maeda et al. |
| 2017/0314641 A1 | 11/2017 | Kamba et al. |
| 2018/0244906 A1 | 8/2018 | Feng et al. |
| 2018/0258239 A1 | 9/2018 | Maeda et al. |

FOREIGN PATENT DOCUMENTS

| | | | | |
|---|---|---|---|---|
| CN | 1479824 | A | 3/2004 | |
| CN | 105190089 | A | 12/2015 | |
| CN | 106147042 | A * | 11/2016 | |
| CN | 107835838 | A | 3/2018 | |
| CN | 107922744 | A | 4/2018 | |
| EP | 1352128 | A1 | 10/2003 | |
| EP | 3345969 | A1 | 7/2018 | |
| JP | 2004-515605 | A | 5/2004 | |
| JP | 2005222933 | A * | 8/2005 | ........ H01M 10/0525 |
| JP | 2007-232205 | A | 9/2007 | |
| JP | 2008-157445 | A | 7/2008 | |
| JP | 2008-185162 | A | 8/2008 | |
| JP | 2016-006245 | A | 1/2016 | |
| JP | 2016-090051 | A | 5/2016 | |
| JP | 2016-121806 | A | 7/2016 | |
| JP | 2016-211113 | * | 12/2016 | |
| JP | 2017-110236 | A | 6/2017 | |
| JP | 2017-150662 | A | 8/2017 | |
| JP | 2018-527430 | A | 9/2018 | |
| WO | 2002046527 | A1 | 6/2002 | |
| WO | 2015130776 | A1 | 9/2015 | |

OTHER PUBLICATIONS

Machine translation of CN 106147042 (no date).*
Machine translation of JP 2005-222933 (no date).*
Sigma Aldrich Polymer Properties Reference available at https://www.sigmaaldrich.com/deepweb/assets/sigmaaldrich/marketing/global/documents/280/103/viscosity.pdf.*
Dec. 8, 2020—International Search Report—Intl App PCT/JP2020/036436.
Sep. 18, 2023—(EP) Extended Search Report—App 20868272.4.
Mar. 18, 2023—(CN) Notification of First Office Action—App 202080066695.7.
"Friction Transmission Belt", compiled by Hongdong Na, World Rubber Industry, vol. 43 No. 3, pp. 31-37, Mar. 2016.
World Rubber Industry, vol. 28 No. 4, Compiled by Zuoling Wang, Formulation echnology for Short Fiber Reinforced Rubber, pp. 49-58, Jan. 20, 2005.

* cited by examiner

*Primary Examiner* — Marc S Zimmer
(74) *Attorney, Agent, or Firm* — Banner & Witcoff, Ltd.

(57) ABSTRACT

A rubber composition includes an elastomer component, a polyvinyl pyrrolidone-based resin, and a non-water-absorbent short fiber, and includes substantially no water-absorbent fiber. The elastomer component may include an ethylene-α-olefin elastomer. The polyvinyl pyrrolidone-based resin may have a K value of 10 to 100. The non-water-absorbent short fiber may include an aliphatic polyamide short fiber.

7 Claims, 2 Drawing Sheets

RUBBER COMPOSITION AND FRICTION TRANSMISSION BELT

CROSS REFERENCE TO RELATED APPLICATIONS

This is a U.S. National Phase Application under 35 U.S.C. § 371 of International Application No. PCT/JP2020/036436, filed Sep. 25, 2020, which claims priority to Japanese Application Nos. 2019-174609, filed Sep. 25, 2019, and 2020-153926, filed Sep. 14, 2020, which were published Under PCT Article 21 (2), the entire contents of which are incorporated herein by reference.

TECHNICAL FIELD

The present invention relates to a rubber composition for forming a power transmission surface of a frictional power transmission belt (in particular, a V-ribbed belt) used for driving auxiliary equipment of automobile engines and the like, and relates to a frictional power transmission belt. More particularly, the present invention relates to a rubber composition for forming a power transmission surface of a frictional power transmission belt that can stabilize a frictional state of a frictional power transmission surface and improve noise suppression while maintaining belt performance such as transmission performance and fuel saving performance, and relates to a frictional power transmission belt.

BACKGROUND ART

In the rubber industry field, in particular, an automobile component is desired to have high functionality and high performance. A frictional power transmission belt is one of rubber products used in such automobile component, and the frictional power transmission belt is widely used for power transmission for driving auxiliary equipment of automobiles such as an air compressor and an alternator, for example. As a belt of this type, a V-ribbed belt is known in which ribs are provided along a belt longitudinal direction, and the V-ribbed belt is required to have noise suppression in addition to belt performance such as transmission performance and fuel saving performance.

As for the noise suppression in an auxiliary equipment driving system of an automobile engine or the like, it is a problem to reduce a friction coefficient of a belt surface (i.e., pulley engagement surface) in contact with a pulley to improve noise easily generated when misalignment (imperfect alignment) occurs in the pulley or noise caused by a stick-slip phenomenon.

The stick-slip phenomenon means self-excited vibration generated between frictional surfaces due to repeated microscopic sticking or slipping of the frictional surfaces to each other. The stick-slip phenomenon occurs in a case where the friction coefficient is decreased with increase of the slip velocity or a case where discontinuous reduction of friction occurs when the friction changes from static friction to dynamic friction. Also in the frictional power transmission belt, when the friction coefficient between a pulley and a power transmission surface rubbing thereon is high (in particular, adhesiveness is high), a stick-slip phenomenon (i.e., vibration) in which sticking and slipping are repeated occurs between the frictional surfaces of the belt and the pulley. As a result, abnormal noise (i.e., squeal noise) occurs in a stage changing from the sticking to the slipping.

Further, stick-slip noise generated during running when submerged is also a problem. In detail, when wettability of a frictional power transmission surface is so low that the state of water entering between a belt and a pulley is not uniform, the friction coefficient is high in a place the water has not entered (i.e., dry state) while the friction coefficient is extremely decreased locally in a place the water has entered (i.e., wet state). As a result, the frictional state becomes unstable to generate stick-slip noise.

So far, from the viewpoint of compounding design of a rubber composition for forming a frictional power transmission surface, a formulation for improving the noise suppression when submerged (reducing abnormal noise due to stick-slip) has been proposed.

Patent Literature 1 discloses a frictional power transmission belt in which at least a frictional power transmission surface is formed of a rubber composition in which 1 to 25 parts by mass of a surfactant is blended with respect to 100 parts by mass of an ethylene-α-olefin elastomer.

Patent Literature 2 discloses a frictional power transmission belt in which at least a frictional power transmission surface is formed of a rubber composition in which 10 to 25 parts by weight of a plasticizer having a solubility index of 8.3 $(cal/cm^3)^{1/2}$ to 10.7 $(cal/cm^3)^{1/2}$ is blended with respect to 100 parts by weight of an ethylene-α-olefin elastomer.

Patent Literature 3 discloses a frictional power transmission belt in which at least a part of a frictional power transmission surface is formed of a rubber composition containing 5 to 50 parts by mass of a water-soluble polymer having a melting point or a softening point of 80° C. or less with respect to 100 parts by mass of rubber. As the water-soluble polymer, polyethylene oxide is used.

Patent Literature 4 discloses a frictional power transmission belt including a compression layer formed of a rubber composition containing a polymer component and polyvinyl alcohol-based resin particles. Patent Literature 5 discloses a frictional power transmission belt in which a surface layer formed of a rubber composition containing polyvinyl alcohol-based resin particles and a polymer component is laminated on a surface of a power transmission surface.

Patent Literature 6 discloses a rubber composition including an ethylene-α-olefin elastomer, polyvinyl pyrrolidone, a cellulose-based fiber, and a vulcanizing agent.

CITATION LIST

Patent Literature

Patent Literature 1: JP-A-2008-185162
Patent Literature 2: JP-A-2007-232205
Patent Literature 3: JP-A-2008-157445
Patent Literature 4: JP-A-2016-090051
Patent Literature 5: JP-A-2016-121806
Patent Literature 6: JP-T-2018-527430 (the term "JP-T" as used herein means a published Japanese translation of a PCT patent application)

SUMMARY OF INVENTION

Technical Problem

In the frictional power transmission belt in Patent Literatures 1 and 2 in which the surfactant or the plasticizer is blended, the affinity between water and the rubber (ethylene-α-olefin elastomer) forming the frictional power transmission surface can be increased by the surfactant or the plasticizer oozed out to the frictional power transmission surface, the frictional state between the belt and the pulley can be stabilized, and the noise suppression when submerged can be improved (abnormal noise due to stick-slip can be reduced).

However, on the other hand, there is a disadvantage that the energy loss (tan δ) due to internal heat generation is increased and the transmission loss (torque loss) is increased, probably due to the unstable behavior of the surfactant or the plasticizer in the rubber. Furthermore, since the surfactant or the plasticizer lacks heat resistance, the surfactant or the plasticizer easily disappears from the frictional power transmission surface during running, and a persistent effect cannot be expected. In particular, when a hydrophilic surfactant is used, a sustained effect cannot be expected because the surfactant is easily dissolved and lost when submerged.

In addition, the water-soluble polymer in Patent Literature 3 also is melted at the time of vulcanization of the belt, and thus is dispersed in an entire compression rubber layer. However, the energy loss (tan δ) due to internal heat generation is increased and the transmission loss (torque loss) is increased, probably due to the melted water-soluble polymer inhibiting crosslinking of the rubber.

In the case of the polyvinyl alcohol-based resin particles in Patent Literatures 4 and 5, the noise suppression when submerged can be improved without increasing the energy loss (tan δ) due to internal heat generation and the transmission loss (torque loss). However, compared to other compounding agents, the polyvinyl alcohol-based resin particles have a larger particle size (even the smallest have an average size of 41 μm), which reduces crack resistance.

Patent Literature 6 discloses that, in a mixing system of environmentally friendly cellulose-based fibers and polyvinyl pyrrolidone (PVP), polarized PVP improves compatibility between the cellulose-based fibers and the non-polarized rubber, thereby improving elastic modulus and tensile strength. However, Patent Literature 6 does not refer to the effect on the noise suppression of the belt and the belt performance such as the transmission efficiency and the durability.

Accordingly, an object of the present invention is to provide a rubber composition that can improve noise suppression while maintaining belt performance of a frictional power transmission belt such as transmission efficiency and durability, and a frictional power transmission belt having a frictional power transmission surface formed of the rubber composition.

Solution to Problem

As a result of intensive studies to achieve the above object, the present inventors have found that noise suppression can be improved while belt performance of a frictional power transmission belt such as transmission efficiency and durability is maintained by combining an elastomer component, a polyvinyl pyrrolidone-based resin, and a non-water-absorbent short fiber substantially without containing a water-absorbent fiber, and have completed the present invention.

That is, the rubber composition of the present invention contains an elastomer component, a polyvinyl pyrrolidone-based resin, and a non-water-absorbent short fiber, and substantially does not contain a water-absorbent fiber. The elastomer component may contain an ethylene-α-olefin elastomer. The K value of the polyvinyl pyrrolidone-based resin may be 10 to 100. The non-water-absorbent short fiber may contain an aliphatic polyamide short fiber. The proportion of the polyvinyl pyrrolidone-based resin may be 1 to 20 parts by mass with respect to 100 parts by mass of the elastomer component. The proportion of the polyvinyl pyrrolidone-based resin may be 3 to 100 parts by mass with respect to 100 parts by mass of the non-water-absorbent short fiber. The proportion of the non-water-absorbent short fiber may be 15 to 50 parts by mass with respect to 100 parts by mass of the elastomer component. The rubber composition preferably does not contain the cellulose-based fiber.

The present invention also provides a frictional power transmission belt having a frictional power transmission surface formed of a cured product of the rubber composition.

Advantageous Effects of Invention

In the present invention, since the elastomer component, the polyvinyl pyrrolidone-based resin, and the non-water-absorbent short fiber are combined, it is possible to improve the noise suppression while maintaining the belt performance of the frictional power transmission belt such as the transmission efficiency and the durability. In particular, by combining the non-water-absorbent short fiber as the short fiber with the polyvinyl pyrrolidone-based resin, the noise suppression when submerged can also be improved.

DESCRIPTION OF EMBODIMENTS

[Characteristics of Rubber Composition]

A rubber composition of the present invention exhibits the effects as described above by blending a combination of a polyvinyl pyrrolidone-based resin and non-water-absorbent short fibers with an elastomer component. In particular, the effect of improving the noise suppression when submerged despite the fact that the non-water-absorbent short fibers as short fibers are combined with the polyvinyl pyrrolidone-based resin is an unexpected effect for the inventors, and the details of the mechanism thereof are not clear, but can be estimated as follows when analyzed later.

First, when water enters between a belt and a pulley, the noise when submerged occurs due to the fact that, in a contact surface with the pulley, a friction coefficient remains high in a place the water has not entered (i.e., dry state) while the friction coefficient is extremely decreased locally in a place the water has entered (i.e., wet state), that is, the dry state and the wet state are mixed at the contact surface with the pulley. In this phenomenon, in related art, measurement of a relationship (μ-V characteristic) between a slip speed (V) and a friction coefficient (s) in submerged running is used as an index, and a stick-slip noise occurs when the friction coefficient is decreased as the slip speed is increased.

Therefore, for the noise suppression, a person skilled in the art employs a method of improving the wettability by increasing the hydrophilicity of an entire contact surface with the pulley (bringing the entire contact surface into a wet state) for the purpose of bringing the contact surface with the pulley into a state in which a dry state and a wet state are not mixed even when submerged. The object is to stabilize a frictional state of the surface by bringing the entire contact surface into the wet state, and to prevent the friction coefficient from decreasing even when the slip speed is increased in the μ-V characteristic (slope of a friction coefficient-slip speed curve, and a change in a friction coefficient μ with respect to a slip speed V when submerged), thereby suppressing noise. A noise suppression improver (plasticizer, surfactant, water-soluble polymer, etc.) of related art is a formulation for reducing a change in the friction coefficient μ with respect to a change in the sliding speed by increasing the hydrophilicity of the entire contact surface with the pulley to improve the wettability (bringing the entire contact surface into the wet state) on the basis of such a concept.

For example, in the case of a liquid plasticizer or surfactant, the plasticizer or surfactant bleeds and presents from the inside of the rubber layer to the contact surface with the pulley. When submerged, a uniform water film is formed over the entire contact surface, which prevents the decrease in the friction coefficient μ even when the sliding speed is increased, thereby improving the noise suppression. However, this state has the following disadvantages (1) to (3).

(1) As the friction coefficient μ itself is decreased, a grip force is decreased, and the transmission performance is decreased (slip loss is increased)
(2) Because of the liquid state, the sustainability of the function on the contact surface is limited due to the influence of the supply and the dissipation to the contact surface
(3) Addition of a plasticizer or surfactant causes a decrease in physical properties (elastic modulus) of rubber and an increase in internal heat generation (an increase in torque loss).

On the other hand, in the case of a solid water-soluble polymer, the water-soluble polymer is present on the contact surface as particles, and a uniform water film is formed when the water-soluble polymer is submerged with water and dissolved little by little. Therefore, the above disadvantages of the plasticizer or surfactant do not occur.

However, among solid water-soluble polymers, a polyvinyl alcohol (PVA)-based resin has a disadvantage that, due to the large particle size thereof, an eluted PVA portion can become a recess and cause defects or cracks from an interface between the rubber layer and the PVA particles when used over a long period of time.

On the other hand, since a polyvinyl pyrrolidone (PVP)-based resin has a smaller particle size than PVA, the crack resistance can be further improved in addition to the improvement of the above disadvantages (1) to (3).

Furthermore, from the viewpoint of the noise suppression when submerged in the rubber layer forming the contact surface with the pulley, in related art, it has been common technical knowledge to combine with water-absorbent fibers (short fibers or fabric) such as cotton (cellulose-based) as disclosed in Patent Literature 6, as the short fibers to be combined with such a water-soluble polymer such as PVP. The reason for this is based on the idea of imparting a function of absorbing and removing water from the water film formed on the contact surface hydrophilized with the noise suppression improver described above when the contact surface is submerged. However, as a result of verification by the present inventors, it has been found that combining the non-water-absorbent short fibers with the PVP-based resin instead of the water-absorbent fibers can achieve both the belt performance such as transmission efficiency and durability and the noise suppression. In particular, selecting short fibers excellent in balance between the mechanical strength and the noise suppression, such as aliphatic polyamide short fibers or polyalkylene arylate short fibers, as the non-water-absorbent short fibers can achieve both the belt performance and the noise suppression at a high level. For example, as described in Examples described later, it is found that there is no significant difference in the noise suppression between Comparative Examples 8 to 9 using cotton short fibers and Examples 1 to 2 and 7 using nylon short fibers or polyethylene terephthalate (PET) short fibers without using the cotton short fibers. The reason for this can be presumed to be that, in Examples 1, 2 and 7, a sufficient water absorption effect is exhibited by the combination of PVP and the non-water-absorbent short fibers. On the other hand, in Comparative Examples 8 to 9, the durability life (crack resistance) is shortened by the water-absorbent short fibers, and it can be estimated that the water-absorbent short fibers inhibit the crack resistance. The reason for this can be presumed to be that the mechanical strength of the cellulose-based fiber itself is insufficient, and the insufficient mechanical strength is further promoted by absorbing water. On the other hand, in the present invention, by combining the non-water-absorbent short fibers (in particular, nylon short fibers excellent in balance between mechanical properties and the noise suppression) with the PVP-based resin, the effects described above, that is, the following effects (1) to (5) in detail can be exhibited.

(1) Noise suppression when submerged (friction coefficient is less likely to decrease even when sliding speed is increased)
(2) Sustainability of noise suppression effect (effect is maintained for a long period of time)
(3) High grip property, that is, high transmission performance can be maintained (slip loss is small)
(4) No decrease in physical properties (elastic modulus) of rubber and no increase in internal heat generation (increase in torque loss)
(5) Crack resistance is excellent and a long durability life is provided.

[Elastomer Component]

The rubber composition (curable rubber composition) of the present invention contains an elastomer component. As the elastomer component, a vulcanizable or crosslinkable rubber may be used. Examples thereof include diene rubbers [natural rubber, isoprene rubber, butadiene rubber, chloroprene rubber, styrene butadiene rubber (SBR), acrylonitrile butadiene rubber (nitrile rubber), hydrogenated nitrile rubber, and the like], an ethylene-α-olefin elastomer, chlorosulfonated polyethylene rubber, alkylated chlorosulfonated polyethylene rubber, epichlorohydrin rubber, acrylic rubber, silicone rubber, urethane rubber, and fluororubber. These elastomer components may be used alone or in combination of two or more. Among these, the ethylene-α-olefin elastomer is preferred from the viewpoint of excellent ozone resistance, heat resistance, cold resistance, and weather resistance, and reducing the belt weight.

The ethylene-α-olefin elastomer contains an ethylene unit or an α-olefin unit as a constituent unit, and may further contain a diene unit. Therefore, the ethylene-α-olefin elastomer includes ethylene-α-olefin copolymer rubber, ethylene-α-olefin-diene terpolymer rubber, and the like.

Examples of the α-olefin for forming the α-olefin unit include chain α-$C_{3\text{-}12}$ olefins such as propylene, butene, pentene, methylpentene, hexene, and octene. Among these α-olefins, α-$C_{3\text{-}4}$ olefins (in particular, propylene) such as propylene are preferred.

As the diene monomer for forming the diene unit, a non-conjugated diene monomer is usually used. Examples of the non-conjugated diene monomer include dicyclopentadiene, methylene norbornene, ethylidene norbornene, 1,4-hexadiene, and cyclooctadiene. Among these diene monomers, ethylidene norbornene and 1,4-hexadiene (in particular, ethylidene norbornene) are preferred.

Typical examples of the ethylene-α-olefin elastomer include an ethylene-propylene copolymer (EPM) and an ethylene-propylene-diene terpolymer (EPDM).

These ethylene-α-olefin elastomers can be used alone or in combination of two or more. Among these, the ethylene-α-olefin-diene terpolymer rubber is preferred, and the ethylene-propylene-diene copolymer (EPDM) is particularly preferred, from the viewpoint of excellent crosslinking efficiency by the diene unit.

In the ethylene-propylene-diene terpolymer, the proportion (mass ratio) of ethylene to propylene may be 35/65 to 90/10, preferably 40/60 to 80/20, more preferably 45/55 to 70/30, and most preferably 50/50 to 60/40.

The diene content of the ethylene-α-olefin elastomer (in particular, ethylene-α-olefin-diene terpolymer rubber such as EPDM) may be 10 mass % or less (e.g., 0.1 mass % to 10 mass %), preferably 7 mass % or less (e.g., 0.3 mass % to 7 mass %), more preferably 5 mass % or less (e.g., 0.5 mass % to 5 mass %), and most preferably 3 mass % or less (e.g., 1 mass % to 3 mass %). In the present invention, the heat resistance is improved by using an elastomer component having no double bond in a main chain, but high heat resistance can be ensured by adjusting the double bond due to the diene unit introduced as a side chain to a small amount. When the diene content is too large, the high heat resistance may not be ensured.

In the present application, the diene content means a mass ratio of the diene monomer unit in all units constituting the ethylene-α-olefin elastomer, and can be measured by a common method, but may be a monomer ratio.

The Mooney viscosity [ML(1+4)125° C.] of the uncrosslinked ethylene-α-olefin elastomer may be 80 or less, and is, for example, 10 to 80, preferably 20 to 70, more preferably 30 to 50, and most preferably 35 to 45, from the viewpoint of adjusting Vm of the rubber composition and improving dispersibility of carbon black. When the Mooney viscosity is too high, the fluidity of the rubber composition may be decreased, and the processability in kneading may be decreased.

In the present application, the Mooney viscosity can be measured by a method according to JIS K6300-1 (2013), and the test conditions are a test temperature of 125° C., a preheating of 1 minute, and a rotor operation time of 4 minutes using an L-shaped rotor.

The proportion of the ethylene-α-olefin elastomer in the elastomer component is 50 mass % or more, preferably 80 mass % or more, more preferably 90 mass % or more, and most preferably 100 mass % (only the ethylene-α-olefin elastomer). When the proportion of the ethylene-α-olefin elastomer in the elastomer component is too small, the heat resistance and the cold resistance may be decreased.

[Polyvinyl Pyrrolidone-Based Resin]

The rubber composition of the present invention further contains a polyvinyl pyrrolidone (PVP)-based resin in addition to the elastomer component.

The PVP-based resin may contain an N-vinyl-2-pyrrolidone unit as a main constituent unit, and may further contain other copolymerizable units.

Examples of the monomer for forming the other copolymerizable units include olefins (e.g., α-$C_{2\text{-}10}$ olefins such as ethylene, propylene, 1-butene, isobutene, and 1-hexene), unsaturated carboxylic acids [e.g., (meth)acrylic acid $C_{1\text{-}6}$ alkyl esters such as (meth)acrylic acid, methyl(meth)acrylate, and ethyl(meth)acrylate, and (anhydrous)maleic acid], fatty acid vinyl esters (e.g., vinyl acetate, vinyl propionate, and vinyl crotonate), vinyl ethers (e.g., $C_{1\text{-}6}$ alkyl vinyl ethers such as methyl vinyl ether, ethyl vinyl ether, and propyl vinyl ether, and $C_{2\text{-}6}$ alkanediol vinyl ethers such as ethylene glycol vinyl ether, 1,3-propanediol vinyl ether, and 1,4-butanediol vinyl ether), and unsaturated sulfonic acids (e.g., ethylene sulfonic acid and allyl sulfonic acid). These monomers may be used alone or in combination of two or more. Among these, the unsaturated carboxylic acids such as (meth)acrylic acid and methyl(meth)acrylate, and the fatty acid vinyl esters such as vinyl acetate are preferred.

In the PVP-based resin, the proportion of the N-vinyl-2-pyrrolidone unit in the resin is, for example, 50 mass % or more (e.g., 50 mass % to 98 mass %), preferably 80 mass % or more (e.g., 80 mass % to 95 mass %), more preferably 90 mass % or more, and most preferably 100 mass %.

The PVP-based resin may be a common modified product or derivative. The form of the PVP-based resin may be linear or branched.

The K value of the PVP-based resin is not particularly limited, but is, for example, 10 to 100, preferably 15 to 99, more preferably 17 to 98, still more preferably 20 to 97, and most preferably 22.5 to 96, from the viewpoint of improving the durability and the noise suppression of the belt. When the K value is too small, the durability and the power transmission property of the belt may be decreased. On the contrary, when the K value is too large, the noise suppression may be decreased.

In the present application, the K value is a viscosity characteristic value correlated with a molecular weight, and can be calculated by applying a relative viscosity value (25° C.) measured by a capillary viscometer to the following Fikentscher formula.

$$K=(1.5 \log \eta_{rel}-1)/(0.15+0.003c)+[300c \log \eta_{rel}+(c+1.5c \log \eta_{rel})^2]^{1/2}/(0.15c+0.003c^2)$$

where $\eta_{rel}$ is the relative viscosity of an aqueous solution of the PVP-based resin with respect to water, and c is a concentration (mass %) of the PVP-based resin in the aqueous solution of the PVP-based resin.

The proportion of the PVP-based resin can be selected from the range of about 0.1 to 25 parts by mass with respect to 100 parts by mass of the elastomer component, and is, for example, 0.1 to 20 parts by mass, preferably 0.5 to 15 parts by mass, more preferably 1 to 10 parts by mass, still more preferably 2 to 8 parts by mass, and most preferably 3 to 7 parts by mass. In particular, from the viewpoint of achieving both belt performance such as high transmission efficiency and the noise suppression, the proportion of the PVP-based resin is preferably 1 to 20 parts by mass, more preferably 2 to 15 parts by mass, and still more preferably 3 to 10 parts by mass with respect to 100 parts by mass of the elastomer component. The proportion of the PVP-based resin is, for example, 3 to 100 parts by mass, preferably 5 to 70 parts by mass, more preferably 10 to 50 parts by mass, still more preferably 12 to 30 parts by mass, and most preferably 15 to 20 parts by mass with respect to 100 parts by mass of the non-water-absorbent short fibers. When the proportion of the PVP-based resin is too small, the noise suppression when submerged may be decreased. On the contrary, when the proportion is too large, the mechanical strength of the rubber composition may be decreased.

[Non-Water-Absorbent Short Fiber]

The rubber composition of the present invention further includes non-water-absorbent short fibers (non-cellulose-based short fibers) in addition to the elastomer component and the PVP-based resin.

Examples of the non-water-absorbent short fibers include polyolefin short fibers (polyethylene short fibers, polypropylene short fibers, etc.), acrylic short fibers (polyacrylonitrile short fibers, etc.), polyamide short fibers (aliphatic polyamide short fibers such as nylon 6 short fibers, nylon 66 short fibers, nylon 610 short fibers, nylon 46 short fibers; aromatic polyamide fibers such as aramid, etc.), polyester short fibers [polyalkylene arylate short fibers such as polyethylene terephthalate (PET) short fibers, polypropylene terephthalate (PPT) short fibers, polytrimethylene terephthalate (PTT) short fibers, polybutylene terephthalate (PBT) short fibers, polyethylene naphthalate (PEN) short fibers, etc.], synthetic fibers such as polyphenylene sulfide (PPS) fibers, polyparaphenylene benzobisoxazole (PBO) fibers, polyurethane fibers; inorganic fibers such as carbon fibers, glass fibers, metal fibers, etc.

These non-water-absorbent short fibers may be used alone or in combination of two or more. Among these, the aliphatic polyamide short fibers and the polyalkylene arylate short fibers are preferred from the viewpoint of excellent transmission efficiency, durability, and noise suppression (in particular, noise suppression when submerged), and the aliphatic polyamide short fibers such as 66 nylon short fibers are particularly preferred from the viewpoint of achieving both high belt performance and high noise suppression when submerged.

The average fiber diameter of the non-water-absorbent short fibers is, for example, 5 μm to 100 μm, preferably 10 μm to 80 μm, more preferably 15 μm to 50 μm, still more preferably 20 μm to 40 μm, and most preferably 25 μm to 30 m. When the fiber diameter is too small, it may be difficult to uniformly disperse the rubber composition. On the contrary, when the fiber diameter is too large, the mechanical properties of the rubber composition may be decreased.

The average fiber length of the non-water-absorbent short fibers is, for example, 0.3 mm to 30 mm, preferably 0.5 mm to 10 mm, more preferably 1 mm to 8 mm, still more preferably 1.5 mm to 5 mm, and most preferably 2 mm to 4 mm. When the fiber length is too short, the mechanical strength of the rubber composition may be decreased. On the contrary, when the fiber length is too long, it may be difficult to uniformly disperse the rubber composition.

In the present application, the average fiber diameter and the average fiber length of the short fibers can be measured by a common method, and for example, can be calculated by measuring an appropriate number of samples (for example, 50 samples) by image analysis of an electron micrograph including a transmission electron microscope and a scanning electron microscope.

An orientation direction of the non-water-absorbent short fibers may be random or may be a predetermined direction, but from the viewpoint of improving the durability of the belt, the non-water-absorbent short fibers are preferably oriented in a belt width direction.

In the present application, "the short fibers are oriented in a belt width direction" means that the short fibers are substantially parallel to the belt width direction, and "substantially parallel to" means that an angle between the short fibers and the belt width direction is 30° or less, preferably 20° or less, and more preferably 10° or less (particularly 5° or less).

As a method of orienting the non-water-absorbent short fibers in a predetermined direction, a method of orienting the non-water-absorbent short fibers in a predetermined direction in the process of preparing an uncrosslinked rubber sheet by rolling a rubber composition kneaded with a Banbury mixer or the like with a roll, a calendar, or the like can be used.

The non-water-absorbent short fibers may be subjected to an adhesion treatment as necessary in order to improve the adhesiveness to the elastomer component (in particular, ethylene-α-olefin elastomer). As the adhesion treatment, a common adhesion treatment can be used, and examples thereof include an immersion treatment into a resin-based treatment liquid in which an adhesive component (e.g., an epoxy compound or an isocyanate compound) is dissolved in an organic solvent (toluene, xylene, methyl ethyl ketone, etc.), an immersion treatment into a resorcin-formalin-latex liquid (RFL liquid), and an immersion treatment into a rubber paste in which the rubber composition is dissolved in an organic solvent.

The proportion of the non-water-absorbent short fibers can be selected from the range of about 5 to 50 parts by mass with respect to 100 parts by mass of the elastomer component, and is, for example, 10 to 50 parts by mass, and is preferably 15 to 50 parts by mass, more preferably 20 to 40 parts by mass, still more preferably 25 to 35 parts by mass, and most preferably 28 to 32 parts by mass, from the viewpoint of achieving both of belt performance such as transmission efficiency and the noise suppression. When the proportion of the non-water-absorbent short fibers is too small, the transmission efficiency, the noise suppression, and the reinforcing effect may be decreased. On the contrary, when the proportion of the non-water-absorbent short fibers is too large, the transmission performance due to the grip property and processability may be decreased, and the belt may be easily cracked to decrease the durability.

[Water-Absorbent Fiber]

The rubber composition of the present invention substantially does not contain water-absorbent fibers in order to improve the transmission efficiency, durability, and noise suppression of the belt.

Examples of the water-absorbent fibers include vinyl alcohol fibers (polyvinyl alcohol, ethylene-vinyl alcohol copolymer fibers, vinylon, etc.), cellulose-based fibers [cellulose fibers (cellulose fibers derived from plants such as pulp and cotton fibers, animals, bacteria, etc.), cellulose derivative fibers (cellulose ester fibers, regenerated cellulose fibers such as rayon, etc.), and the like].

The rubber composition of the present invention preferably substantially does not contain the water-absorbent fibers (in particular, cellulose-based fibers), but particularly preferably does not contain the water-absorbent fibers (in particular, cellulose-based fibers) from the viewpoint of highly improving the transmission efficiency, durability, and noise suppression of the belt.

[Crosslinking Agent]

The rubber composition of the present invention may further contain a commonly used crosslinking agent (or vulcanizing agent) in addition to the elastomer component, the PVP-based resin, and the non-water-absorbent short fibers. When the elastomer component is an ethylene-α-olefin elastomer, the crosslinking agent may be an organic peroxide or a sulfur-based vulcanizing agent.

Examples of the organic peroxide include diacyl peroxide (dilauroyl peroxide, dibenzoyl peroxide, etc.), peroxyketal [1,1-di(t-butylperoxy)cyclohexane, 2,2-di(t-butylperoxy)butane, etc.], alkylperoxyester (t-butylperoxybenzoate, etc.), dialkyl peroxide [di-t-butylperoxide, dicumyl peroxide, t-butylcumyl peroxide, 2,5-dimethyl-2,5-di(t-butylperoxy)hexane, 2,5-dimethyl-2,5-di(t-butylperoxy)hexyne-3,1,1-di(t-butylperoxy)-3,3,5-trimethylcyclohexane, 1,3-bis(2-t-butylperoxyisopropyl)benzene, 2,5-di-methyl-2,5-di(benzoylperoxy)hexane, etc.], peroxycarbonate (t-butylperoxyisopropyl carbonate, t-butylperoxy-2-ethylhexyl carbonate, t-amylperoxy-2-ethylhexyl carbonate, etc.). These organic peroxides may be used alone or in combination of two or more. Among these, the dialkyl peroxide such as 1,3-bis(2-t-butylperoxyisopropyl)benzene is preferred.

Examples of the sulfur-based vulcanizing agent include powdered sulfur, precipitated sulfur, colloidal sulfur, insoluble sulfur, highly dispersible sulfur, and sulfur chlorides (such as sulfur monochloride and sulfur dichloride).

These crosslinking agents may be used alone or in combination of two or more. Among these, the crosslinking agent containing an organic peroxide is preferred.

The proportion of the vulcanizing agent or crosslinking agent (in particular, organic peroxide) is, for example, 0.1 to 30 parts by mass, preferably 1 to 20 parts by mass, more preferably 3 to 10 parts by mass, and most preferably 4 to 6 parts by mass with respect to 100 parts by mass of the elastomer component.

[Reinforcing Agent]

The rubber composition of the present invention may further contain a reinforcing agent in addition to the elastomer component, the PVP-based resin, and the non-water-absorbent short fiber. Examples of the reinforcing agent include carbon black, silica, clay, calcium carbonate, talc, and mica. These reinforcing agents can be used alone or in combination of two or more. Among these, the carbon black and the silica are preferred, and the carbon black is particularly preferred.

The proportion of the reinforcing agent is, for example, 10 to 200 parts by mass, preferably 20 to 150 parts by mass, more preferably 30 to 100 parts by mass, and most preferably 50 to 80 parts by mass with respect to 100 parts by mass of the elastomer component.

[Other Components]

The rubber composition of the present invention may further contain a commonly used additive used as a compounding agent for rubber. Examples of the common additive include a co-crosslinking agent (bismaleimides, etc.), a vulcanization aid or a vulcanization accelerator (thiuram accelerator, etc.), a vulcanization retarder, a metal oxide (zinc oxide, magnesium oxide, calcium oxide, barium oxide, iron oxide, copper oxide, titanium oxide, aluminum oxide, etc.), a softener (oils such as paraffin oil and naphthenic oil, etc.), a processing agent or a processing aid (stearic acid, metal stearate, wax, paraffin, fatty acid amide, etc.), a silane coupling agent, an anti-aging agent (antioxidant, heat age resister, bending crack inhibitor, ozone deterioration inhibitor, etc.), a colorant, a tackifier, a stabilizer (ultraviolet absorber, heat stabilizer, etc.), a flame retardant, and an antistatic agent. These additives may be used alone or in combination of two or more. The metal oxide may act as the crosslinking agent.

The total proportion of the common additives is, for example, 5 to 50 parts by mass, preferably 10 to 30 parts by mass, and more preferably 15 to 25 parts by mass with respect to 100 parts by mass of the elastomer component.

[Method for Preparing Rubber Composition]

In a method for preparing the rubber composition of the present invention, the rubber composition can be prepared by mixing (or kneading) each component by a common method, but in order to uniformly mix, it is preferable to knead the elastomer component, the PVP-based resin, the non-water-absorbent short fibers, and other components under heating. The heating temperature is, for example, 120° C. or less, preferably 50° C. to 120° C., more preferably 60° C. to 100° C., and still more preferably 70° C. to 90° C. When the heating temperature is too high, the elastomer component may be crosslinked.

[Characteristics of Cured Product]

The cured product (crosslinked body) of the rubber composition of the present invention is excellent in μ-V characteristic (slope of a friction coefficient-slip velocity curve) after heat aging, and the μ-V characteristic of the cured product after heat aging at 150° C. for 720 hours is, for example, 0 to −0.1, preferably −0.01 to −0.095, more preferably −0.03 to −0.09, and most preferably −0.05 to −0.085. When the μ-V characteristic is too small (when the slope of the graph is too large), the noise suppression of the belt may be decreased.

In the present application, the μ-V characteristic can be measured by a method described in Examples to be described later.

The cured product (crosslinked body) of the rubber composition of the present invention has a low internal loss tangent (tan δ) of, for example, 0.08 to 0.17, preferably 0.09 to 0.165, more preferably 0.1 to 0.16, still more preferably 0.11 to 0.15, and most preferably 0.12 to 0.14. When the tan δ is too high, the internal heat generation may be increased, and the energy loss (transmission loss) may be increased.

In the present application, the loss tangent (tan δ) can be measured by a method described in Examples to be described later, and in the case of a cured product in which the short fibers are arranged in a predetermined direction, the loss tangent is measured in a direction (reverse grain direction) perpendicular to an arrangement direction (grain direction) of the short fibers.

[Molded Body]

The cured product of the rubber composition of the present invention can be used as various molded bodies because of excellent grip resistance, durability, and the like, and is preferably used as a rubber layer that forms a frictional power transmission surface (contact surface with a pulley) of a frictional power transmission belt because the cured product can improve the noise suppression while maintaining the belt performance such as transmission efficiency and durability of the frictional power transmission belt.

Examples of the frictional power transmission belt include a flat belt and a V-belt such as a wrapped V-belt, a raw edge V-belt, a raw edge cogged V-belt, and a V-ribbed belt. Among these, as applications that require fuel savings, a V-ribbed belt used in an auxiliary equipment driving system of an automobile engine or the like, and a raw edge V-belt (including a raw edge cogged V-belt) used in a continuously variable transmission of a motorcycle or the like are more preferred, and a V-ribbed belt used in an auxiliary equipment driving system of an automobile engine is particularly preferred from the viewpoint of requiring high durability and noise suppression.

In the frictional power transmission belt such as a V-ribbed belt or a raw-edge V-belt, the rubber composition of the present invention may form a compression rubber layer (inner surface rubber layer) and/or a tension layer (back surface rubber layer). Examples of the frictional power transmission belt in which the tension layer is a back surface rubber layer include a V-ribbed belt that is run in a back surface drive layout in which the belt back surface is in contact with a pulley. Among these, a frictional power transmission belt in which at least the compression rubber layer is formed of the rubber composition of the present invention is preferred.

The frictional power transmission belt can be produced by a common method depending on the type of the belt.

EXAMPLE

The present invention is described below in detail based on examples. However, the present invention is not limited by the examples. Details of the raw materials used in Examples are shown below.

[Raw Material]
EPDM1: "Nordel (registered trademark) IP3640" manufactured by The Dow Chemical Company, Mooney viscosity (125° C.) of approximately equal to 40, ethylene content: 55 mass %, diene content: 1.8 mass %
EPDM2: "EPT4045M" manufactured by Mitsui Chemicals, Inc., Mooney viscosity (125° C.) of approximately equal to 45, ethylene content: 51 mass %, diene content: 7.6 mass %
Nylon short fiber: average fiber diameter: 27 μm, average fiber length: 3 mm (Nylon 66 short fiber)
Polyester short fiber: average fiber diameter: 25 μm, average fiber length: 3 mm (PET short fiber)
Aramid short fiber: average fiber diameter: 15 μm, average fiber length: 8 mm (meta aramid short fiber)
Cotton short fiber: average fiber length: 6 mm
Polyvinyl pyrrolidone 1: "Polyvinyl pyrrolidone K-30" manufactured by Nippon Shokubai Co., Ltd., K value: 27.0 to 33.0
Polyvinyl pyrrolidone 2: "Polyvinyl pyrrolidone K-90" manufactured by Nippon Shokubai Co., Ltd., K value: 88.0 to 96.0
Polyvinyl pyrrolidone 3: "Polyvinyl pyrrolidone K-25" manufactured by FUJIFILM Wako Pure Chemical Corporation, K value: 22.5 to 27.0
Surfactant: "EMULGEN LS-106" manufactured by Kao Corporation, polyoxyalkylene alkyl ether
Polyvinyl alcohol: "DENKA POVAL F-300S" manufactured by Denka Company Ltd., polyvinyl alcohol hydrophobic group-modified product, saponification degree: 93.0 mol to 97.0 mol, viscosity average polymerization degree: 1700, melting point: 206° C., type of hydrophobic group: alkyl group
Carbon black: "SEAST 3" manufactured by Tokai Carbon Co., Ltd.
Silica: "Ultrasil VN3" manufactured by Evonik Industries AG, BET specific surface area: 180 m²/g
Paraffin oil: "Diana (registered trademark) PW-90" (paraffinic-based process oil) manufactured by Idemitsu Kosan Co., Ltd.
Zinc oxide: "Zinc Oxide second grade" manufactured by Hakusui Tech Co., Ltd.
Stearic acid: "Stearic acid Tsubaki" manufactured by NOF Corporation
Anti-aging agent 1: benzimidazole anti-aging agent, "Nocrac MB" manufactured by Ouchi Shinko Chemical Co., Ltd.
Anti-aging agent 2: diphenylamine anti-aging agent, "Nocrac AD-F" manufactured by Ouchi Shinko Chemical Co., Ltd.
Co-crosslinking agent: "VULNOC PM" manufactured by Ouchi Shinko Chemical Industrial Co., Ltd
Organic peroxide: "PERBUTYL P-40 MB" manufactured by NOF Corporation
Sulfur: manufactured by Miwon Chemicals Co., Ltd
Vulcanization accelerator: "Nocceler (registered trademark) DM" manufactured by Ouchi Shinko Chemical Industrial Co., Ltd.
Carbon black dispersion liquid: "Aqua-Black 162" manufactured by Tokai Carbon Co., Ltd., solid content: 19.2 mass %
Cotton woven fabric: plain woven fabric having cotton yarn 20s/2, warp yarns 70 yarns/5 cm, and weft yarns 70 yarns/5 cm
Cord: twisted cord prepared by twisting 1,000-denier PET fiber in a twist configuration of 2×3 with a final twisting coefficient of 3.0 and a primary twisting coefficient of 3.0, and subjecting the obtained cord having a total denier of 6,000 to a bonding treatment; cord diameter of 1.0 mm.

Examples 1 to 11 and Comparative Examples 1 to 13

[Compression Rubber Layer]
For a compression rubber layer forming a power transmission surface (contact surface with a pulley) of a belt, a sheet was used obtained by kneading a rubber composition for a compression rubber layer having a formulation shown in Tables 3 to 6 at 140° C. using a Banbury mixer and rolling the kneaded mixture into a predetermined thickness using a calendar roll.

[Adhesive Rubber Layer]
A sheet for an adhesive rubber layer was obtained by kneading a rubber composition for an adhesive rubber layer having a formulation shown in Table 1 using a Banbury mixer, and rolling the kneaded mixture into a predetermined thickness using a calendar roll.

TABLE 1

| (Composition for adhesive rubber layer) | |
| --- | --- |
| Composition | Parts by mass |
| EPDM2 | 100 |
| Stearic acid | 1 |
| Zinc oxide | 5 |
| Carbon black | 35 |
| Silica | 20 |
| Resorcinol formaldehyde condensate | 2 |
| Anti-aging agent 2 | 2 |
| Vulcanization accelerator | 1 |
| Hexamethoxy methylol melamine | 2 |
| Sulfur | 1 |
| Total | 169 |

[Tension Layer]
As a cotton woven fabric for forming a tension layer, a cotton woven fabric was used obtained by immersing an untreated cotton woven fabric (plain weave of cotton yarn 20s/2, warp yarns 70 yarns/5 cm, and weft yarns 70 yarns/5 cm) in a composition for a tension layer (black dyeing liquid) shown in Table 2 and containing a carbon black dispersion liquid and an RFL liquid (latex, resorcin, and formalin) for 10 seconds, performing a wide angle treatment at 120° by a tenter, and performing a heat treatment at 150° C. for 4 minutes.

TABLE 2

| (Composition for tension layer) | |
| --- | --- |
| Composition | Parts by mass |
| 40 mass % vinyl pyridine latex | 100.0 |
| Carbon black dispersion | 214.3 |
| Resorcin | 14.6 |
| 37% formalin | 9.2 |
| Caustic soda | 1.5 |
| Water | 436.0 |
| Total | 775.6 |

[Crosslinked Rubber Properties of Composition for Compression Rubber Layer]

An uncrosslinked rubber sheet for a compression rubber layer was pressed and heated (temperature: 170° C., surface pressure: 2.0 MPa) for 30 minutes using a pressing machine to prepare a crosslinked rubber sheet.

1) Measurement of μ-V Characteristic

A disk-shaped test piece having a diameter of 8 mm and a thickness of 2 mm was taken from the crosslinked rubber sheet, and a friction force was measured using a pin-on-disk friction coefficient measuring device to calculate the friction coefficient. Specifically, the test piece was pressed with a load of 2.192 kgf/cm² using a mating material (SUS304) having a surface roughness Ra of 0.8 μm, and the friction force was measured at a friction speed of 0 m/sec to 2.0 m/sec while applying water to the test piece only when the measurement was performed at a water amount of 30 ml/min, and a slope of a curve of a friction coefficient with respect to a friction speed (sliding speed with respect to the mating material) was calculated by a least-squares method. The slope represents a change in the friction coefficient with respect to the slip speed.

Further, an accelerated aging test according to JIS K6257 (2010) was performed, and the friction force was also measured for the test piece after heat aging was performed at 150° C. for 720 hours, and the slope of the curve of the friction coefficient with respect to the friction speed (sliding speed with respect to the mating material) was calculated by the least-squares method.

As the pin-on-disk friction coefficient measuring device, a "pin-on-disk friction testing machine" manufactured by Yonekura MFG. Co., Ltd. was used. In the accelerated aging test, the A method AA-2 forced circulation type thermal aging testing machine (crosswind type) was used.

2) Measurement of Dynamic viscoelasticity (E', tan δ)

A test piece having a rectangular cross-sectional shape (thickness: 2.0 mm, width: 4.0 mm) and a length of 40 mm was taken from the crosslinked rubber sheet. At this time, the reverse grain direction of the rolling was taken as a length direction. Then, the test piece was chucked and fixed to a chuck of a viscoelasticity measuring device ("VR-7121" manufactured by Ueshima Seisakusho Co., Ltd.) at a chuck-to-chuck distance of 15 mm, an initial strain (static strain) of 1.0% was applied, an elastic modulus (E') and a loss tangent (tan δ) at 70° C. were obtained at a frequency of 10 Hz, a dynamic strain of 0.2% (that is, a strain of ±0.2% was applied in a longitudinal direction with the initial strain of 1.0% as a center position or a reference position), and a heating rate of 1° C./min.

[Production of V-ribbed Belt]

A cotton woven fabric for forming a tension layer was wound around an outer periphery of a cylindrical molding mold having a smooth surface, a twisted yarn cord serving as a cord was spirally spun around the outer periphery of the cotton woven fabric at predetermined intervals, and an uncrosslinked adhesive rubber layer sheet and a compression rubber layer sheet were sequentially wound around the outer periphery of the twisted yarn cord to form an uncrosslinked molded body. Thereafter, with a vulcanization jacket covering the periphery of the uncrosslinked molded body, the molding mold with the uncrosslinked molded body is placed in a crosslinking device (so-called vulcanization can), cross-linking was performed under predetermined heating and pressurizing conditions (180° C., 0.9 MPa), and then the mold was removed from the molding mold to obtain a tubular cross-linking sleeve. Then, the outer surface of the cross-linking sleeve was ground with a grinding wheel to form predetermined V-rib portions, and then the cross-linking sleeve was cut with a cutter blade at a predetermined width in a belt longitudinal direction to be finished into a 3PK1100 V-ribbed belt (number of ribs: 3, peripheral length: 1100 mm, belt type: K type, belt thickness: 4.3 mm, rib height: about 2 mm, rib pitch: 3.56 mm) and a 6PK1100 V-ribbed belt (number of ribs: 6, peripheral length: 1100 mm, belt type: K type, belt thickness: 4.3 mm, rib height: about 2 mm, rib pitch: 3.56 mm). By reversing the inner peripheral side and the outer peripheral side of the cut belt, a V-ribbed belt including a compression rubber layer having a V-rib portion on the inner peripheral side was obtained.

[Evaluation of Performance of V-ribbed Belt]

1) Noise Limit Angle Test (Misalignment Noise Evaluation Test)

Figure 1:
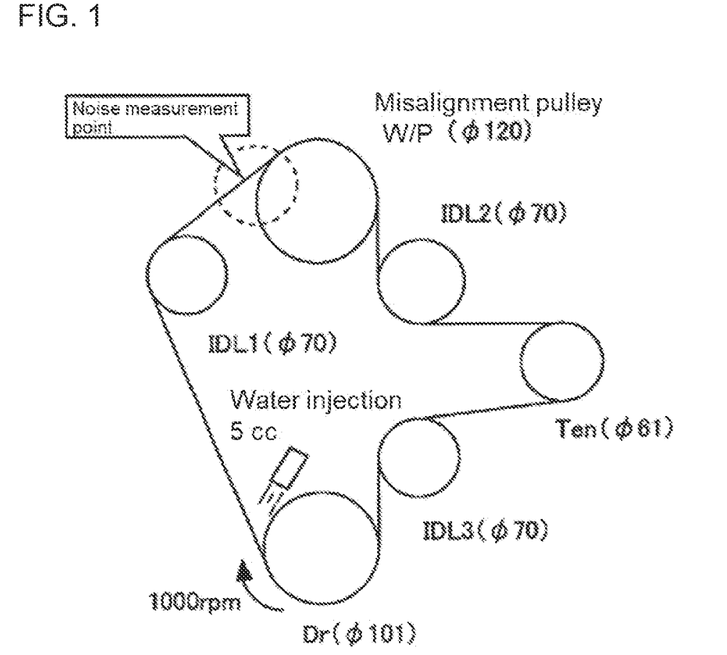
FIG. 1 is a schematic diagram showing a layout of a misalignment noise test of a belt obtained in an example.

A noise limit angle test (misalignment noise evaluation test) was performed using a testing machine having a layout shown in FIG. 1 in which a driving pulley (Dr.) having a diameter of 101 mm, an idler pulley (IDL1) having a diameter of 70 mm, a misalignment pulley (W/P) having a diameter of 120 mm, an idler pulley (IDL2) having a diameter of 70 mm, a tension pulley (Ten) having a diameter of 61 mm, and an idler pulley (IDL3) having a diameter of 70 mm were arranged in this order. An axis distance (span length) between the idler pulley (IDL1) and the misalignment pulley was set to 135 mm, and all of the pulleys were adjusted so as to locate on the same plane (angle of misalignment: 0°).

That is, the 6PK1100 V-ribbed belt was suspended on each pulley of the testing machine, tension was applied so that the rotation speed of the driving pulley was 1000 rpm and the belt tension was 50 N/Rib under room temperature conditions, 5 ml of water was injected periodically (at intervals of about 30 seconds) onto a frictional power transmission surface of the V-ribbed belt in the vicinity of an outlet of the driving pulley, and an angle (noise limit angle) was obtained at which noise (in the vicinity of an inlet of the misalignment pulley) occurred when the belt was run with misalignment (misalignment pulley was shifted to a front side with respect to each pulley). The larger the noise limit angle is, the more excellent the noise suppression is. Normally, the belt is misaligned from the pulley (that is, rib misalignment occurs) at around 3°, and the power is not normally transmitted.

Figure 2:
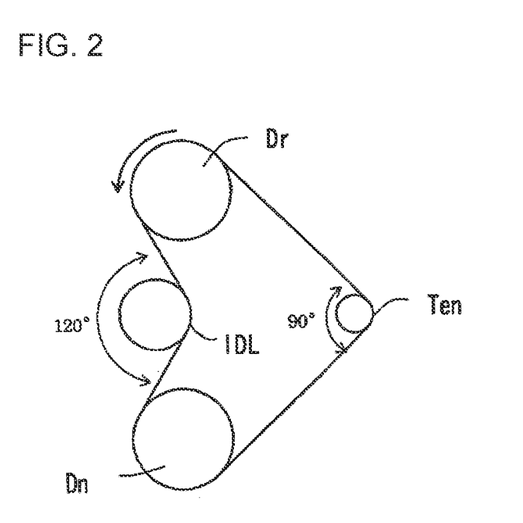
FIG. 2 is a schematic diagram showing a layout of a misalignment noise test of a belt after running in a testing machine in FIG. 1.

For the evaluation of the belt after running, a belt was used after running with a running testing machine having a layout shown in FIG. 2 in which a driving pulley (Dr.) having an outer diameter of 120 mm, an idler pulley (IDL) having an outer diameter of 85 mm, a driven pulley (Dn.) having an outer diameter of 120 mm, and a tension pulley (Ten.) having an outer diameter of 45 mm were arranged in this order. The 6PK1100 V-ribbed belt was hung on each pulley of the testing machine, and a winding angle of the belt around the idler pulley was adjusted to 120°, a winding angle of the belt around the tension pulley was adjusted to 90°, and the belt tension was adjusted to 395 N. The noise limit angle test was performed on a belt that had been run for 200 hours with the rotation speed of the driving pulley being 4900 rpm (a direction of rotation was the direction of the arrow in the figure), the driven pulley load being 8.8 kW, and the ambient temperature being 140° C.

2) Transmission Performance Test

Figure 3:
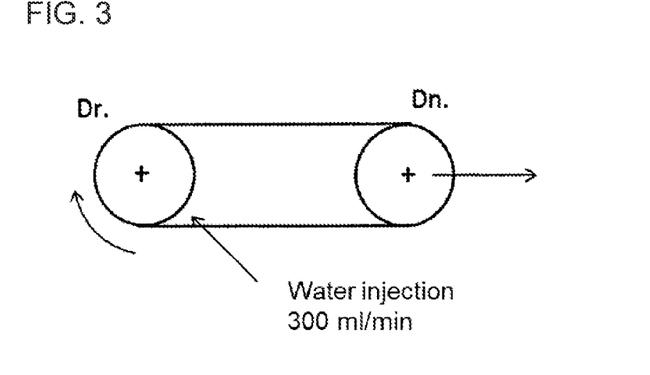
FIG. 3 is a schematic diagram showing a layout of a transmission performance test of a belt obtained in examples.

In the transmission performance test, a testing machine was used having a layout shown in FIG. 3 in which a driving pulley (Dr.) having a diameter of 120 mm and a driven pulley (Dn.) having a diameter of 120 mm were arranged in this order. Then, the 3PK1100 V-ribbed belt was hung on both pulleys of the testing machine, the V-ribbed belt was run under test conditions of the rotation speed of the driving pulley of 2000 rpm and a belt tension of 15.3 kgf/3 ribs, a load was gradually applied to a driven pulley, 300 ml of water was injected periodically (at intervals of about 60 seconds) onto a frictional power transmission surface of the V-ribbed belt in the vicinity of an inlet of the driving pulley, and a transmission power (kw) when a slip ratio of the belt became 2% was measured.

3) Durability Running Test (High-Temperature Low Tension Bending Fatigue Test)

Figure 4:
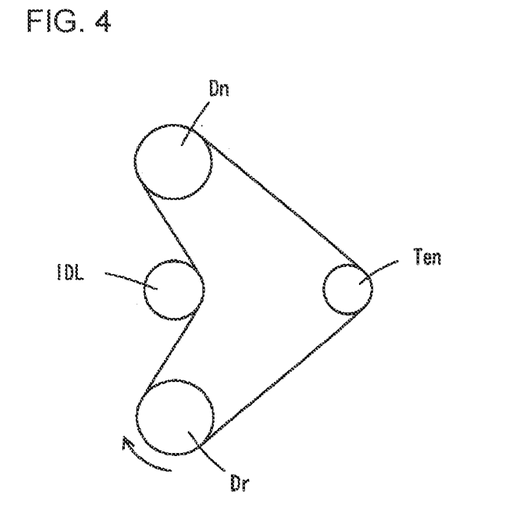
FIG. 4 is a schematic diagram showing a layout of a durability running test of a belt obtained in examples.

A testing machine was used having a layout shown in FIG. 4 in which a driving pulley (Dr.) having an outer diameter of 120 mm, an idler pulley (IDL) having an outer diameter of 85 mm, a driven pulley (Dn.) having an outer diameter of 120 mm, and a tension pulley (Ten.) having an outer diameter of 45 mm were arranged in this order. The 3PK1100 V-ribbed belt was hung on each pulley of the testing machine, and the winding angle of the V-ribbed belt around the tension pulley was adjusted to 90°, and the winding angle of the V-ribbed belt around the idler pulley was adjusted to 120°. The 3PK1100 V-ribbed belt was run for an upper limit of 400 hours with the rotation speed of the driving pulley being 4900 rpm (the rotation direction was the direction of the arrow in the figure), the belt tension being 40 kgf/3 ribs, the ambient temperature being 120° C., and a load of 12PS being applied to the driven pulley. When an abnormality such as a crack occurred in the rubber layer of the belt before 400 hours were reached, the time was determined to be the end of life, and the running was stopped. In the case where no failure or abnormality occurred that would result in the end of the life even after completing running for 400 hours, the belt was determined as a belt having a running life of 400 hours or more, and was determined as a belt having excellent crack resistance.

4) Measurement of Transmission Loss (Torque Loss)

Figure 5:
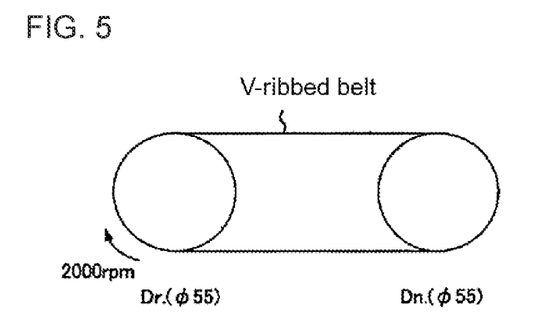
FIG. 5 is a schematic diagram showing a layout of a biaxial running test for measuring a transmission loss of a V-ribbed belt obtained in examples.

A biaxial running testing machine was used having a layout shown in FIG. 5, which includes a driving pulley (Dr) having a diameter of 55 mm and a driven pulley (Dn) having a diameter of 55 mm. The 6PK1100 V-ribbed belt was hung on the testing machine, a predetermined initial tension was applied to the V-ribbed belt with a tension of 500 N/one belt, and a difference between a drive torque and a driven torque when the driving pulley was rotated at 2000 rpm with no load on the driven pulley was calculated as a torque loss. The torque loss obtained by this measurement includes not only the torque loss caused by the V-ribbed belt but also the torque loss caused by the bearing of the testing machine. Therefore, a metal belt (material: maraging steel) in which the torque loss of the belt is considered to be substantially 0 was run in advance, and the difference between the drive torque and the driven torque was obtained as the torque loss (bearing loss) caused by the bearing. Then, a value obtained by subtracting the torque loss caused by the bearing (bearing loss) from the torque loss calculated by running the V-ribbed belt (torque loss caused by both of the belt and the bearing) was obtained as the torque loss caused by the belt alone. The torque loss (bearing loss) is a torque loss when the metal belt is run at the predetermined initial tension (for example, in the case of the V-ribbed belt is run at an initial tension of 500 N/one belt, the torque loss when the metal belt is run at this initial tension becomes the bearing loss).

When power is transmitted, the energy loss (transmission loss) occurs. Examples of the energy loss include an internal loss caused by self-heating of the rubber composition constituting the belt and a bending loss caused by bending deformation of the belt. Normally, a "torque loss" value calculated by a difference between a drive torque value in a drive shaft and a driven torque value in a driven shaft is used as an index of the energy loss, it can be determined that the smaller the torque loss is, the better the transmission efficiency is (the smaller the transmission loss is), and the "torque loss" value is also used as an index of fuel saving performance in an automobile engine or the like. Also in this test, the transmission efficiency affecting the fuel saving performance was compared from the measurement result of the torque loss.

The evaluation results of Examples and Comparative Examples are shown in Tables 3 to 6.

TABLE 3

|  |  | Comp. Ex. 1 | Ex. 1 | Comp. Ex. 2 | Comp. Ex. 3 | Comp. Ex. 4 |
| --- | --- | --- | --- | --- | --- | --- |
| Composition | EPDM1 | 100.0 | 100.0 | 100.0 | 100.0 | 100.0 |
| (part by mass) | Nylon short fiber | 30.0 | 30.0 | 30.0 | 30.0 | 30.0 |
|  | PET short fiber | — | — | — | — | — |
|  | Aramid short fiber | — | — | — | — | — |
|  | Polyvinyl pyrrolidone 1 | — | 5.0 | — | — | — |
|  | Surfactant | — | — | 5.0 | 15.0 | — |
|  | Polyvinyl alcohol | — | — | — | — | 5.0 |
|  | Carbon black | 60.0 | 60.0 | 60.0 | 60.0 | 60.0 |
|  | Paraffin oil | 5.0 | 5.0 | 5.0 | 5.0 | 5.0 |
|  | Zinc oxide | 5.0 | 5.0 | 5.0 | 5.0 | 5.0 |
|  | Stearic acid | 1.5 | 1.5 | 1.5 | 1.5 | 1.5 |
|  | Anti-aging agent 1 | 2.5 | 2.5 | 2.5 | 2.5 | 2.5 |
|  | Co-crosslinking agent | 2.0 | 2.0 | 2.0 | 2.0 | 2.0 |
|  | Organic peroxide | 5.0 | 5.0 | 5.0 | 5.0 | 5.0 |
|  | Sulfur | 0.2 | 0.2 | 0.2 | 0.2 | 0.2 |

TABLE 3-continued

| | | | | | | | |
|---|---|---|---|---|---|---|---|
| Rubber properties | Grip property | Friction coefficient when submerged | 0.091 | 0.087 | 0.068 | 0.055 | 0.086 |
| | μ-V Characteristic | Before heat aging | −0.083 | −0.043 | −0.061 | −0.048 | −0.045 |
| | | After heat aging for 30 days | −0.120 | −0.085 | −0.104 | −0.068 | −0.084 |
| | Elastic characteristic | Elastic modulus (reverse grain) 70° C. (MPa) | 38.24 | 35.59 | 31.30 | 17.67 | 35.70 |
| | Internal heat generation | tanδ (reverse grain) 70° C. | 0.135 | 0.135 | 0.146 | 0.160 | 0.136 |
| Belt performance | Noise suppression | When dried before running for 200 hours (°) | 2.0 | 3.5 or more | 3.5 or more | 3.5 or more | 3.5 or more |
| | | When submerged before running for 200 hours (°) | 1.1 | 3.5 or more | 3.0 | 3.5 or more | 3.0 |
| | | When submerged after running for 200 hours (°) | 0.8 | 2.0 | 1.1 | 1.5 | 1.8 |
| | Transmission performance | Transmission power (kW) when submerged | 1.434 | 1.423 | 1.288 | 1.119 | 1.380 |
| | Transmission efficiency | Torque loss (N · m) | 0.260 | 0.258 | 0.302 | 0.330 | 0.285 |
| | Durability | Durability running test for 400 hours (lifetime) | running completion | running completion | running completion | running completion | 310 hr |

| | | | Comp. Ex. 5 | Ex. 2 | Comp. Ex. 6 | Ex. 3 |
|---|---|---|---|---|---|---|
| Composition (part by mass) | | EPDM1 | 100.0 | 100.0 | 100.0 | 100.0 |
| | | Nylon short fiber | — | — | — | — |
| | | PET short fiber | 30.0 | 30.0 | — | — |
| | | Aramid short fiber | — | — | 30.0 | 30.0 |
| | | Polyvinyl pyrrolidone 1 | — | 5.0 | — | 5.0 |
| | | Surfactant | — | — | — | — |
| | | Polyvinyl alcohol | — | — | — | — |
| | | Carbon black | 60.0 | 60.0 | 60.0 | 60.0 |
| | | Paraffin oil | 5.0 | 5.0 | 5.0 | 5.0 |
| | | Zinc oxide | 5.0 | 5.0 | 5.0 | 5.0 |
| | | Stearic acid | 1.5 | 1.5 | 1.5 | 1.5 |
| | | Anti-aging agent 1 | 2.5 | 2.5 | 2.5 | 2.5 |
| | | Co-crosslinking agent | 2.0 | 2.0 | 2.0 | 2.0 |
| | | Organic peroxide | 5.0 | 5.0 | 5.0 | 5.0 |
| | | Sulfur | 0.2 | 0.2 | 0.2 | 0.2 |
| Rubber properties | Grip property | Friction coefficient when submerged | 0.094 | 0.090 | 0.080 | 0.082 |
| | μ-V Characteristic | Before heat aging | −0.085 | −0.052 | −0.095 | −0.051 |
| | | After heat aging for 30 days | −0.121 | −0.090 | −0.125 | −0.093 |
| | Elastic characteristic | Elastic modulus (reverse grain) 70° C. (MPa) | 38.33 | 36.20 | 52.54 | 51.86 |
| | Internal heat generation | tanδ (reverse grain) 70° C. | 0.138 | 0.140 | 0.141 | 0.145 |
| Belt performance | Noise suppression | When dried before running for 200 hours (°) | 2.1 | 3.5 or more | 1.5 | 2.9 |
| | | When submerged before running for 200 hours (°) | 1.0 | 3.5 or more | 0.8 | 2.0 |
| | | When submerged after running for 200 hours (°) | 0.8 | 1.8 | 0.4 | 1.5 |
| | Transmission performance | Transmission power (kW) when submerged | 1.440 | 1.406 | 1.387 | 1.396 |
| | Transmission efficiency | Torque loss (N · m) | 0.251 | 0.263 | 0.265 | 0.270 |
| | Durability | Durability running test for 400 hours (lifetime) | running completion | running completion | running completion | running completion |

TABLE 4

| | | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|
| Composition (part by mass) | EPDM1 | 100.0 | 100.0 | 100.0 | 100.0 | 100.0 | 100.0 |
| | Nylon short fiber | — | — | — | — | — | 10.0 |
| | Cotton short fiber | 30.0 | 30.0 | 30.0 | 30.0 | 30.0 | 15.0 |
| | Polyvinyl pyrrolidone 1 | — | 5.0 | 15.0 | — | — | 5.0 |
| | Surfactant | — | — | — | 5.0 | 15.0 | — |
| | Carbon black | 60.0 | 60.0 | 60.0 | 60.0 | 60.0 | 60.0 |
| | Paraffin oil | 5.0 | 5.0 | 5.0 | 5.0 | 5.0 | 5.0 |
| | Zinc oxide | 5.0 | 5.0 | 5.0 | 5.0 | 5.0 | 5.0 |
| | Stearic acid | 1.5 | 1.5 | 1.5 | 1.5 | 1.5 | 1.5 |
| | Anti-aging agent 1 | 2.5 | 2.5 | 2.5 | 2.5 | 2.5 | 2.5 |

TABLE 4-continued

|  |  |  | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|
|  |  | Co-crosslinking agent | 2.0 | 2.0 | 2.0 | 2.0 | 2.0 | 2.0 |
|  |  | Organic peroxide | 5.0 | 5.0 | 5.0 | 5.0 | 5.0 | 5.0 |
|  |  | Sulfur | 0.2 | 0.2 | 0.2 | 0.2 | 0.2 | 0.2 |
| Rubber properties | Grip property μ-V Characteristic | Friction coefficient when submerged | 0.096 | 0.090 | 0.081 | 0.071 | 0.057 | 0.087 |
|  |  | Before heat aging | −0.054 | −0.050 | −0.049 | −0.050 | −0.048 | −0.045 |
|  |  | After heat aging for 30 days | −0.079 | −0.077 | −0.075 | −0.078 | −0.076 | −0.080 |
|  | Elastic characteristic | Elastic modulus (reverse grain) 70° C. (MPa) | 52.90 | 52.80 | 56.70 | 27.70 | 18.65 | 44.15 |
|  | Internal heat generation | tanδ (reverse grain) 70° C. | 0.133 | 0.125 | 0.146 | 0.138 | 0.159 | 0.127 |
| Belt performance | Noise suppression | When dried before running for 200 hours (°) | 3.5 or more | 3.5 or more | 3.5 or more | 3.5 or more | 3.5 or more | 3.5 or more |
|  |  | When submerged before running for 200 hours (°) | 3.5 or more | 3.5 or more | 3.5 or more | 3.5 or more | 3.5 or more | 3.5 or more |
|  |  | When submerged after running for 200 hours (°) | 2.1 | 2.2 | 2.3 | 2.0 | 1.9 | 2.0 |
|  | Transmission performance | Transmission power (kW) when submerged | 1.446 | 1.417 | 1.444 | 1.278 | 1.098 | 1.418 |
|  | Transmission efficiency | Torque loss (N · m) | 0.252 | 0.250 | 0.277 | 0.311 | 0.343 | 0.259 |
|  | Durability | Durability running test for 400 hours (lifetime) | 315 hr | 315 hr | 305 hr | 315 hr | 305 hr | 320 hr |

TABLE 5

|  |  | Ex. 1 | Ex. 4 | Ex. 5 | Ex. 6 |
|---|---|---|---|---|---|
| Composition (part by mass) | EPDM1 | 100.0 | 100.0 | 100.0 | 100.0 |
|  | Nylon short fiber | 30.0 | 30.0 | 30.0 | 30.0 |
|  | Polyvinyl pyrrolidone 1 | 5.0 | — | — | 1.0 |
|  | Polyvinyl pyrrolidone 2 | — | 5.0 | — | — |
|  | Polyvinyl pyrrolidone 3 | — | — | 5.0 | — |
|  | Carbon black | 60.0 | 60.0 | 60.0 | 60.0 |
|  | Paraffin oil | 5.0 | 5.0 | 5.0 | 5.0 |
|  | Zinc oxide | 5.0 | 5.0 | 5.0 | 5.0 |
|  | Stearic acid | 1.5 | 1.5 | 1.5 | 1.5 |
|  | Anti-aging agent 1 | 2.5 | 2.5 | 2.5 | 2.5 |
|  | Co-crosslinking agent | 2.0 | 2.0 | 2.0 | 2.0 |
|  | Organic peroxide | 5.0 | 5.0 | 5.0 | 5.0 |
|  | Sulfur | 0.2 | 0.2 | 0.2 | 0.2 |
| Rubber properties | Grip property μ-V Characteristic | Friction coefficient when submerged | 0.087 | 0.091 | 0.085 | 0.090 |
|  |  | Before heat aging | −0.043 | −0.045 | −0.045 | −0.062 |
|  |  | After heat aging for 30 days | −0.085 | −0.080 | −0.078 | −0.100 |
|  | Elastic characteristic | Elastic modulus (reverse grain) 70° C. (MPa) | 35.59 | 37.54 | 36.54 | 37.56 |
|  | Internal heat generation | tanδ (reverse grain) 70° C. | 0.135 | 0.135 | 0.140 | 0.133 |
| Belt performance | Noise suppression | When dried before running for 200 hours (°) | 3.5 or more | 3.5 or more | 3.5 or more | 3.0 |
|  |  | When submerged before running for 200 hours (°) | 3.5 or more | 3.5 or more | 3.5 or more | 2.2 |
|  |  | When submerged after running for 200 hours (°) | 2.0 | 1.9 | 2.0 | 1.5 |
|  | Transmission performance | Transmission power (kW) when submerged | 1.423 | 1.450 | 1.444 | 1.440 |
|  | Transmission efficiency | Torque loss (N · m) | 0.258 | 0.262 | 0.260 | 0.260 |
|  | Durability | Durability running test for 400 hours (lifetime) | running completion | running completion | running completion | running completion |

|  |  | Ex. 7 | Ex. 8 | Ex. 9 |
|---|---|---|---|---|
| Composition (part by mass) | EPDM1 | 100.0 | 100.0 | 100.0 |
|  | Nylon short fiber | 30.0 | 30.0 | 30.0 |
|  | Polyvinyl pyrrolidone 1 | 15.0 | 20.0 | 25.0 |
|  | Polyvinyl pyrrolidone 2 | — | — | — |
|  | Polyvinyl pyrrolidone 3 | — | — | — |
|  | Carbon black | 60.0 | 60.0 | 60.0 |
|  | Paraffin oil | 5.0 | 5.0 | 5.0 |
|  | Zinc oxide | 5.0 | 5.0 | 5.0 |
|  | Stearic acid | 1.5 | 1.5 | 1.5 |

TABLE 5-continued

|  |  |  |  |  |  |
|---|---|---|---|---|---|
|  |  | Anti-aging agent 1 | 2.5 | 2.5 | 2.5 |
|  |  | Co-crosslinking agent | 2.0 | 2.0 | 2.0 |
|  |  | Organic peroxide | 5.0 | 5.0 | 5.0 |
|  |  | Sulfur | 0.2 | 0.2 | 0.2 |
| Rubber properties | Grip property | Friction coefficient when submerged | 0.079 | 0.077 | 0.075 |
|  | μ-V Characteristic | Before heat aging | −0.053 | −0.050 | −0.049 |
|  |  | After heat aging for 30 days | −0.073 | −0.071 | −0.081 |
|  | Elastic characteristic | Elastic modulus (reverse grain) 70° C. (MPa) | 40.93 | 41.18 | 42.45 |
|  | Internal heat generation | tanδ (reverse grain) 70° C. | 0.154 | 0.157 | 0.160 |
| Belt performance | Noise suppression | When dried before running for 200 hours (°) | 3.5 or more | 3.5 or more | 3.5 or more |
|  |  | When submerged before running for 200 hours (°) | 3.5 or more | 3.5 or more | 3.5 or more |
|  |  | When submerged after running for 200 hours (°) | 2.4 | 2.3 | 2.4 |
|  | Transmission performance | Transmission power (kW) when submerged | 1.439 | 1.405 | 1.411 |
|  | Transmission efficiency | Torque loss (N · m) | 0.280 | 0.294 | 0.304 |
|  | Durability | Durability running test for 400 hours (lifetime) | running completion | running completion | running completion |

TABLE 6

|  |  |  | Comp. Ex. 13 | Ex. 10 | Ex. 11 |
|---|---|---|---|---|---|
| Composition (part by mass) |  | EPDM1 | 100.0 | 100.0 | 100.0 |
|  |  | Nylon short fiber | 10.0 | 10.0 | 10.0 |
|  |  | Polyvinyl pyrrolidone 1 | — | 5.0 | 10.0 |
|  |  | Carbon black | 60.0 | 60.0 | 60.0 |
|  |  | Paraffin oil | 5.0 | 5.0 | 5.0 |
|  |  | Zinc oxide | 5.0 | 5.0 | 5.0 |
|  |  | Stearic acid | 1.5 | 1.5 | 1.5 |
|  |  | Anti-aging agent 1 | 2.5 | 2.5 | 2.5 |
|  |  | Co-crosslinking agent | 2.0 | 2.0 | 2.0 |
|  |  | Organic peroxide | 5.0 | 5.0 | 5.0 |
|  |  | Sulfur | 0.2 | 0.2 | 0.2 |
| Rubber properties | Grip property | Friction coefficient when submerged | 0.114 | 0.117 | 0.114 |
|  | μ-V Characteristic | Before heat aging | −0.114 | −0.061 | −0.058 |
|  |  | After heat aging for 30 days | −0.123 | −0.094 | −0.074 |
|  | Elastic characteristic | Elastic modulus (reverse grain) 70° C. (MPa) | 27.54 | 26.71 | 28.42 |
|  | Internal heat generation | tanδ (reverse grain) 70° C. | 0.127 | 0.134 | 0.139 |
| Belt performance | Noise suppression | When dried before running for 200 hours (°) | 1.1 | 2.1 | 2.5 |
|  |  | When submerged before running for 200 hours (°) | 0.5 | 1.1 | 1.3 |
|  |  | When submerged after running for 200 hours (°) | 0.4 | 0.9 | 1.0 |
|  | Transmission performance | Transmission power (kW) when submerged | 1.514 | 1.508 | 1.510 |
|  | Transmission efficiency | Torque loss (Nm) | 0.340 | 0.345 | 0.343 |
|  | Durability | Durability running test for 400 hours (lifetime) | running completion | running completion | running completion |

As shown in Tables 3, 5 and 6, examples in which polyvinyl pyrrolidone (PVP) was used as a noise suppression improver, and non-water-absorbent nylon short fibers, polyester (PET) short fibers, or aramid short fibers were used as the short fibers were Examples 1 to 11. As the physical properties of the rubber composition alone, all of the grip force (magnitude of the friction coefficient), the μ-V characteristic (the change of p accompanying the increase of the slip speed), the internal heat generation, and the elastic characteristic were excellent, and as a result, as the belt performance, a high level could be secured in all of the noise suppression, the transmission performance, the transmission efficiency (torque loss), and the durability life (crack resistance) when submerged.

As is clear from the results in Table 3, as compared with configurations of Examples 1 to 3, in Comparative Examples 1, 5, and 6 in which the noise suppression improver was not added, p was significantly decreased as the sliding speed was increased in the μ-V characteristic as the physical properties of the rubber composition alone, and the noise suppression was inferior in the noise limit angle test as the belt performance.

As compared with the configuration of Example 1, in Comparative Examples 2 and 3 in which the surfactant was added as the noise suppression improver, the grip force (friction coefficient) was decreased, and the internal heat generation and elastic characteristic were also decreased as the physical properties of the rubber composition alone. As a result, the transmission performance and the transmission efficiency (torque loss) when submerged were inferior. As the noise suppression, some effects were obtained from the μ-V characteristic and the results of the noise limit angle test, but the following superiority and inferiority were observed as compared with Example 1.

(1) In Example 1, the effect can be obtained even when the amount of the noise suppression improver is small (5 parts by mass), whereas in Comparative Examples 2 and 3, the effect is small in Comparative Example 2 in which the amount of the noise suppression improver is small (5 parts by mass).

(2) In Example 1, the noise suppression effect is maintained even in the state of running and heat aging, but in Comparative Examples 2 and 3, the effect is greatly attenuated in the state of running and heat aging, and the sustainability is insufficient.

As compared with the configuration of Example 1, in Comparative Example 4 in which polyvinyl alcohol particles were added as the noise suppression improver, a tendency similar to that of Example 1 was observed, but in the durability running test, the rubber layer of the belt was cracked and the life was reached before reaching 400 hours, which resulted in inferior crack resistance with respect to Example 1.

When Example 1 in which PVP and nylon short fibers were combined and Example 3 in which PVP and aramid short fibers were combined were compared, the elastic characteristic serving as an index of mechanical strength was larger in Example 3, but on the other hand, the noise suppression of the belt was superior in Example 1 both during drying and during wetting. In addition, when Comparative Example 1 in which nylon short fibers were used and Comparative Example 6 in which aramid short fibers were used were compared with each other in a composition containing no PVP, Comparative Example 6 was inferior to Comparative Example 1 in terms of the noise suppression, which can be attributed to the short fibers themselves. From these results, it was found that nylon short fibers are superior to aramid short fibers in terms of the noise suppression. Furthermore, from the viewpoint of the effect of adding PVP, in Example 1 in which PVP was added to the composition in Comparative Example 1, the noise suppression was improved to a high level, whereas in Example 3 in which PVP was added to the composition in Comparative Example 6, the noise suppression was not improved to a high level. Therefore, the aramid short fiber cannot obtain the combined effect with PVP as much as that of the nylon short fibers, and the combination of PVP and the nylon short fibers can achieve both the belt performance and the noise suppression at a high level.

As is clear from the results shown in Table 4, Comparative Examples 7 to 12 are examples in which cotton short fibers (water-absorbent short fibers), which have been commonly used as measures against the noise suppression when submerged, are used as the short fibers.

As compared with configurations of Example 1 and Example 7 described later (an example in which the amount of PVP was increased with respect to Example 1), in Comparative Examples 8 and 9 in which the short fibers were cotton short fibers, a tendency similar to that of Examples 1 and 7 was observed in most items, but in the durability running test, the crack resistance was inferior to those of Examples 1 and 7 in that cracks occurred in the rubber layer of the belt and the life was reached before 400 hours.

As comparative data related to the use of the cotton short fibers, Comparative Example 7 shows an example in which the noise suppression improver was not added, and Comparative Examples 10 to 11 show an example in which the surfactant was used as the noise suppression improver. In each of Comparative Examples 7 to 11 in which cotton short fibers were used, the effect of the noise suppression when submerged was exhibited at a high level. On the other hand, in Examples 1 and 2 in which PVP was used, the same high level of noise suppression effect was exhibited even when the addition amount was small (5 parts by mass). That is, when PVP and specific non-water-absorbent fibers are used in combination, water absorption by cotton short fibers is unnecessary. Rather, it is preferable not to use cotton, as compared with Examples 1 and 2, because the durability life (crack resistance) is inhibited by the cotton short fibers in Comparative Examples 7 to 11.

Further, in Comparative Example 12, 10 parts by mass of nylon short fibers and 15 parts by mass of cotton short fibers are used in combination. Since the aramid fibers are blended with EPDM together with the cellulose-based fibers in Examples in Patent Literature 6, Comparative Example 12 in which the water-absorbent fibers and the non-water-absorbent fibers are combined corresponds to Examples in Patent Literature 6. In Comparative Example 12, a tendency similar to that of Example 1 was observed in most of items, but in the durability running test, the rubber layer of the belt cracked and reached the end life thereof before reaching 400 hours. Therefore, in the combination of the cellulose-based fibers and the aramid short fibers, the durability life (crack resistance) is inhibited by the cotton short fibers, and it is preferable not to contain the water-absorbent fibers.

As is clear from the results in Table 5, the same effects as in Example 1 were obtained also in the case of using polyvinyl pyrrolidone 2 (Example 4) having a K value of 88.0 to 96.0 and polyvinyl pyrrolidone 3 (Example 5) having a K value of 22.5 to 27.0 with respect to polyvinyl pyrrolidone 1 (K value of 27.0 to 33.0) in Example 1.

In Table 5, the proportion of PVP was changed from 1 part by mass to 25 parts by mass with the proportion of nylon short fibers being constant (30 parts by mass) with respect to the composition in Example 1. Example 6 (1 part by mass) in which the proportion of PVP was reduced, Example 7 (15 parts by mass), Example 8 (20 parts by mass), and Example 9 (25 parts by mass) in which the proportion of PVP was increased were compared with Example 1 (5 parts by mass).

In Example 1, as an effect of using PVP as the noise suppression improver and non-water-absorbent short fibers as the short fibers in combination, the balance of transmission performance by the grip force (magnitude of friction coefficient), μ-V characteristic (the change of μ accompanying the increase of the slip speed), internal heat generation, and elastic characteristic was excellent. As a result, as the belt performance, a high level was secured in all of the noise suppression, transmission performance, transmission efficiency (torque loss), and durability life (crack resistance) when submerged.

On the other hand, in Example 6 in which the amount of PVP was decreased, the noise suppression was decreased due to the influence of the decrease in the μ-V characteristic, but the balance of the respective characteristics was excellent, which was a practically acceptable level. On the other hand, in Example 7 (15 parts by mass) and Example 8 (20 parts by mass) in which the amount of PVP was increased, there was a tendency that the grip force was slightly decreased and the internal heat generation was slightly increased as compared with Example 1, but the balance of the respective characteristics was excellent as in Example 1. In Example 9 (25 parts by mass) in which the amount of PVP was further increased, although the noise suppression was excellent, the internal heat generation was slightly increased, and the transmission efficiency (torque loss) was slightly decreased as compared with other Examples. From these results, the proportion of PVP is preferably 1 to 20 parts by mass from the viewpoint of the balance of the respective characteristics.

As is clear from the results in Table 6, even when the amount of nylon short fibers was reduced to 10 parts by mass, in Example 10 (5 parts by mass) and Example 11 (10 parts by mass) in which PVP was used, the μ-V characteristic and the noise suppression were improved as the effects of PVP, without causing a decrease in high transmission performance, elastic characteristic, transmission efficiency (torque loss), and durability due to high grip property (friction coefficient), as compared with Comparative Example 13 in which PVP was not used.

In addition, from the influence of the weight loss of the nylon short fibers, when the amount of the nylon short fibers was reduced to 10 parts by mass as compared with the case where 30 parts by mass of the nylon short fibers were added (Example 1, Comparative Example 1, etc.), the grip property (friction coefficient) and the transmission performance associated therewith were increased, but the noise suppression and the transmission efficiency (torque loss) were decreased.

Furthermore, with respect to the proportion of PVP to the nylon short fibers, the balance of the respective characteristics was excellent in both Example 6 in which the proportion of PVP was small and Example 11 in which the proportion of PVP was large.

In the configuration of the present invention, it was verified that the effect of noise suppression when submerged can be obtained without impairing the durability life (crack resistance).

Although the present invention has been described in detail with reference to a specific embodiment, it is obvious to those skilled in the art that various changes and modifications may be made without departing from the gist and the scope of the invention.

This application is based on Japanese Patent Application 2019-174609 filed on Sep. 25, 2019, and Japanese Patent Application 2020-153926 filed on Sep. 14, 2020, contents of which are incorporated by reference herein.

INDUSTRIAL APPLICABILITY

The rubber composition of the present invention can be used as various molded bodies, and in particular, can be preferably used as a flat belt or a frictional power transmission belt such as a wrapped V-belt, a raw edge V-belt, a raw edge cogged V-belt, or a V-ribbed belt.

The invention claimed is:

1. A rubber composition comprising an elastomer component, a polyvinyl pyrrolidone-based resin, and a non-water-absorbent short fiber, wherein the rubber composition comprises substantially no water-absorbent fiber,
   wherein the non-water-absorbent short fiber has an average fiber length of 0.3 mm to 30 mm,
   wherein a proportion of the polyvinyl pyrrolidone-based resin is 1 to 20 parts by mass with respect to 100 parts by mass of the elastomer component, and
   wherein a proportion of the polyvinyl pyrrolidone-based resin is 3 to 100 parts by mass with respect to 100 parts by mass of the non-water-absorbent short fiber.

2. The rubber composition according to claim 1, wherein the elastomer component comprises an ethylene-α-olefin elastomer.

3. The rubber composition according to claim 1, wherein the polyvinyl pyrrolidone-based resin has a K value of 10 to 100.

4. The rubber composition according to claim 1, wherein the non-water-absorbent short fiber comprises an aliphatic polyamide short fiber.

5. The rubber composition according to claim 1, wherein a proportion of the non-water-absorbent short fiber is 15 to 50 parts by mass with respect to 100 parts by mass of the elastomer component.

6. The rubber composition according to claim 1, comprising no cellulose-based fiber.

7. A frictional power transmission belt comprising a frictional power transmission surface formed of a cured product of the rubber composition according to claim 1.

* * * * *